Figure 1:
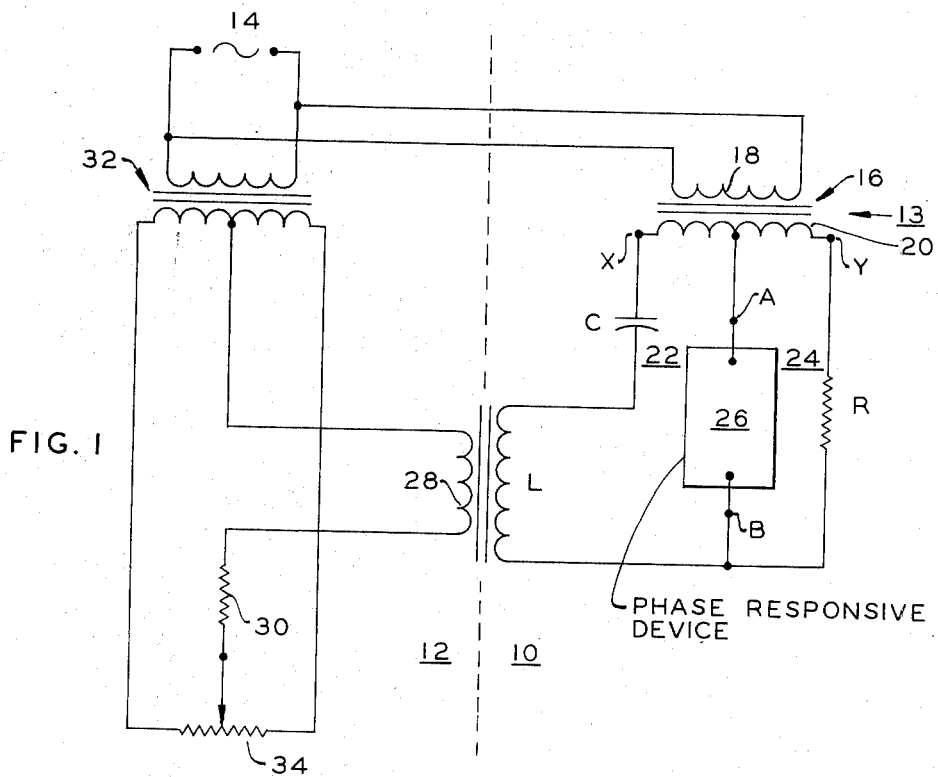

Jan. 11, 1955

S. STEINITZ 2,699,526

POWER TRANSMISSION

Filed March 3, 1951

*INVENTOR.*
STEPHAN STEINITZ
BY Ralph L. Tweedale
ATTORNEY

United States Patent Office

2,699,526
Patented Jan. 11, 1955

2,699,526

POWER TRANSMISSION

Stephan Steinitz, St. Louis, Mo., assignor to Vickers Incorporated, Detroit, Mich., a corporation of Michigan Application March 3, 1951, Serial No. 213,758

22 Claims. (Cl. 323—112)

This invention relates to power transmission and more particularly to frequency detection in alternating current circuits.

In many alternating current circuit applications it is important to determine the direction and degree of deviation from a particular frequency. For example, in order to automatically regulate the frequency of an alternator, it is necessary to detect the amount and direction of frequency deviation from the desired output frequency in order to compensate for any such deviation by changing the speed of the motor operating the alternator.

Various forms of frequency detection apparatus employing resonant LC circuits have heretofore been proposed, the LC circuit generally being tuned to a referenced frequency. In order to change or tune such a circuit to any desired frequency, either the inductance or capacitance elements are varied, generally by some mechanical means such as shiftable plates in an adjustable condenser or changeable core elements in an adjustable inductor. Remote switchboard control of such variable elements is effected by motor relays or tap changing relays. Disadvantages of such a set-up are readily apparent.

In accordance with one embodiment of the invention a frequency detector in the form of a bridge has a resistor in one arm and an LC circuit in an opposite arm, the resistor having a value equal to or in other fixed ratio to the resistance of the LC circuit when resonant to a desired predetermined reference frequency. The output of the detector is zero at the reference frequency and provides signals of opposite phase when the detected frequency is above or below the reference frequency. The invention employs a novel means for tuning the LC branch to resonate at any desired frequency by changing the reactance of its inductive winding with a properly phased auxiliary current supplied to a second winding coupled to the inductive winding of the LC branch, the auxiliary current being of the same frequency as the bridge supply frequency. This feature of the invention has independent utility where it is desired to control the apparent inductance of an inductive winding in a resonant LC circuit by an auxiliary control current.

It is therefore an object of this invention to provide a new and useful tunable frequency detector circuit.

Another object of this invention is the provision of a novel frequency detector with a tunable resonant circuit, the detector providing an output signal of one phase when the detected frequency is above a reference frequency and of opposite phase when the detected frequency is below the reference frequency.

A further object of the invention is an apparatus for tuning a resonant circuit, especially that of a frequency detector by means of auxiliary control current.

Further objects and advantages of the present invention will be apparent from the following description, reference being had to the accompanying drawing wherein a preferred form of the present invention is clearly shown.

In the drawing:

Figure 1 is a circuit diagram illustrating one embodiment of the invention.

Figure 2:
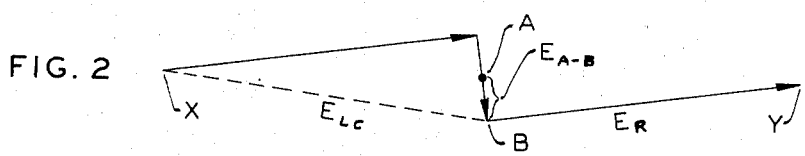
Figure 3:
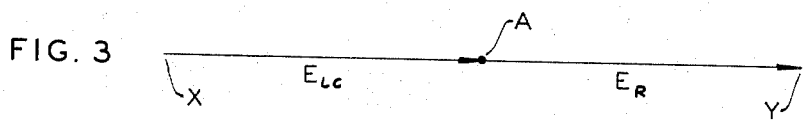
Figure 4:
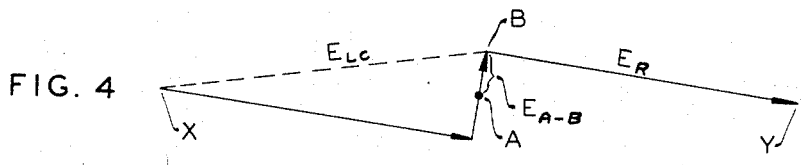

Figures 2, 3, and 4 are vector diagrams showing voltage relationships in the bridge circuit.

Referring now to Figure 1, the circuit illustrated therein includes a frequency detecting bridge 10 on the right side of the dashed line, and a tuning circuit 12 on the left side of the line. The bridge 10 is provided with an input circuit 13 for receiving an alternating current whose frequency is to be detected, for example, from an A. C. line 14 which may lead to the output terminals of an alternator, the frequency of which is to be regulated by controlling its rotor speed through the medium of appropriate devices controlled by currents from the output terminals A and B of the bridge 10. The input circuit 13 includes a transformer 16 having a primary 18 connected to the line 14, and a secondary 20 with a tap point connected to terminal A of the output circuit.

A pair of opposite arms 22 and 24 are connected between the input and output circuits of the bridge, one end of each arm being connected to opposite sides of the secondary 20 while the other end of the arms are joined at the output terminal B.

The arm 22 includes an inductive winding L and a capacitor C forming a resonant circuit at a desirable reference frequency. A resistor R in the other arm 24 preferably has a resistance value equal to or in other proper ratio to the resistance of the arm 22 at resonance, so that the ratio of the voltages between the terminal A and the terminals X and Y of the secondary 20 will correspond to the ratio of the resistance arm 24 and the resistance of the LC arm at resonance, thus providing zero voltage across the output terminals A and B when the supply frequency coupled to the input is equal to the resonant frequency of the LC circuit. If desirable for special purposes, the relative position of the tap along the transformer secondary 20 and the resistance relations of the arms can be arranged to provide other than zero bridge output at the resonant frequency of the arm 22, i. e., a degree of balance indicated by other than zero output.

A phase sensitive device 26 is connected across the output terminals A and B to utilize the voltages across the output, which are indicative of the frequency deviations of the input A. C. from the resonant frequency to which the branch 22 is tuned. The device 26 may be a phase sensitive indicator, a control circuit responsive to the phase of a control voltage, or any other device sensitive to the phase of current or voltage. For example, the device 26 may be a phase sensitive control circuit for controlling the speed of an alternator through the field of the prime mover.

For small deviations of the supply frequency applied to the input circuit 13 below and above the reference or resonant frequency of the arm 22, the bridge voltage across A and B is substantially proportional to the frequency deviation and substantially 90 electrical degrees leading or lagging the supply voltage, depending on the direction of frequency shift, i. e., the bridge output voltage due to a frequency deviation above the reference frequency will be substantially 180 degrees out of phase with the output voltage when the deviation is below the reference frequency.

Figures 2, 3, and 4 are vector diagrams showing, respectively, the voltage relations in the bridge when the supply of frequency is (a) under the reference (resonance) frequency, (b) equal to the reference frequency, and (c) above the reference frequency. $E_{LC}$ is the voltage across arm 22; $E_R$ the voltage across R; and $E_{A-B}$ the voltage across the bridge output terminals A and B. From these vector diagrams it is readily seen that for small frequency deviations the bridge output voltage will be substantially 90 degrees out of phase with the transformer supply voltage, and that the output voltage $E_{A-B}$, when the supply frequency is below resonance (Figure 2) is substantially 180 degrees out of phase with $E_{A-B}$ when the supply frequency is above resonance (Figure 4).

Instead of mechanically adjusting either the capacitive or inductive elements of branch 22, the LC circuit is tuned to resonate at any desired reference frequency by generating with auxiliary means, mmfs. either in an aiding or opposing relation to the mmfs. (ampere-turns) due to the currents in the inductive winding L. An increase of auxiliary mmfs. additive with the ampere-turns of winding L will create an apparent increase in the reactance of the winding, thus lowering the resonant frequency of branch 22. On the other hand, reducing such auxiliary mmfs. or reversing their phase results in an apparent decrease in the reactance of winding L and raises the resonant frequency of the branch 22.

To generate such control "tuning" mmfs., a current of the proper phase and frequency is sent through tuning winding 28 tightly coupled to the inductive winding L. Although a magnetic core is unnecessary to the theoretical functioning of the circuit, the close coupling required for practical operation is preferably obtained by winding the coils L and 28 on a common magnetic core having a suitable air gap for providing the desired degree of linearity and operation under conditions of substantially constant permeability. A gapless core operated in regions of adequate flux densities is also suitable for the purpose.

The frequency of the control tuning current supplied to the tuning winding 28 must be the same as the supply frequency applied to the input circuit 13 to avoid complexities introduced by varying phase relations. The phase of the tuning current should be such that the tuning winding current in its alternations passes through zero at substantially the same time that current through the inductive winding L passes through zero in its alternations i. e., the tuning winding current should be substantially in phase or in phase opposition with the inductive winding current in order that the ampere-turns values of both currents add or subtract magnetically. Since it is the addition or subtraction of the tuning coil ampere turns to or from the inductance winding ampere turns that effects the tuning of the resonant circuit, it will be realized that any auxiliary tuning current of the proper frequency may be employed as long as it has a substantial component either in phase or in phase opposition to the inductance winding current.

Suitable tuning current is supplied to the coil 28 by the arrangement shown in the circuit 12. A predominantly resistive series circuit is formed by the tuning winding 28 and a resistor 30 having a high resistance value as compared to the reactance of winding 28. Current flowing through this series circuit will be practically in phase with A. C. voltage applied to it due to the predominant resistance of its impedance.

By means of a transformer 32 connected to the A. C. source 14 the series circuit of coil 28 and resistor 30 is supplied through a phase reversing potentiometer 34 with a voltage of the same frequency and substantially in phase or 180° out of phase with the voltage supplied to the resonant circuit branch 22. Thus with respect to time the zero points of the alternations of the tuning current in the tuning winding 28 will substantially coincide with the zero points of the current cycle in the inductive winding L, i. e., the currents in the two windings will be substantially in phase or in phase opposition with each other. The in or out of phase selection is made by shifting the potentiometer tap to one or the other side of electrical center or zero current position which is an intermediate point along the potentiometer. Thus by selectively shifting the potentiometer tap, the ampere-turns values of the currents in the coils can be made either magnetically subtractive or additive to apparently decrease or increase the reactance of the inductive winding L as desired, thus tuning the LC circuit to the desired resonant frequency. The amount of reactance change required in either direction is regulated by controlling the tuning current amplitude in the desired direction. This is provided by the resistance adjustability of the potentiometer on both sides of electrical center.

Although the LC circuit of the bridge illustrated herein is a series resonant circuit, the invention is equally applicable in connection with parallel resonant circuits.

While the form of embodiment of the invention as herein disclosed constitutes a preferred form, it is to be understood that other forms might be adopted, all coming within the scope of the claims which follow.

What is claimed is as follows:

1. An alternating current frequency detector comprising an input for receiving an alternating current whose frequency is to be detected, a reference resonant circuit coupled to said input and including a capacitor and an inductive winding connected to form a resonant circuit, an output circuit coupled to said reference circuit for providing output voltages indicative of the frequency of the alternating current applied to the input, and means for adjusting the apparent inductance of said inductive winding in order to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying a tuning current to said tuning winding of the same frequency as that of any alternating current applied to said input, said auxiliary circuit having means for phasing said tuning current so that the tuning winding current in its alternations passes through zero at substantially the same time that the inductive winding current alternations pass through zero when an alternating current is applied to said input.

2. An alternating current frequency detector comprising an input for receiving an alternating current whose frequency is to be detected, a reference resonant circuit coupled to said input and including a capacitor and an inductive winding, an output circuit coupled to said reference circuit for providing output voltages indicative of the frequency of the alternating current applied to the input, and means for adjusting the apparent inductance of said inductive winding in order to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying an adjustable tuning current to said tuning winding of the same frequency as that of any alternating current applied to said input, said auxiliary circuit having means for phasing said tuning current so that the tuning winding current in its alternations passes through zero at substantially the same time that the inductive winding current alternations pass through zero when an alternating current is applied to said input.

3. An alternating current frequency detector comprising an input for receiving an alternating current whose frequency is to be detected, a reference resonant circuit coupled to said input and including a capacitor and an inductive winding, an output circuit coupled to said reference circuit for providing output voltages indicative of the frequency of the alternating current applied to the input, and means for adjusting the apparent inductance of said inductive winding in order to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs.

4. An alternating current frequency detector comprising an input for receiving an alternating current whose frequency is to be detected, a reference resonant circuit coupled to said input and including a capacitor and an inductive winding, an output circuit coupled to said reference circuit for providing output voltages indicative of the frequency of the alternating current applied to the input, and means for adjusting the apparent inductance of said inductive winding in order to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmfs. is changed by the independently obtained mmfs., said means including a tuning winding inductively coupled to said inductive winding, and an auxiliary circuit for supplying a tuning current to said tuning winding of the same frequency as that of any alternating current applied to said input, said auxiliary circuit having phase shifting means for selectively phasing said tuning current so that the tuning winding current is substantially either in phase or in phase opposition with the inductive winding current when an alternating current is applied to said input.

5. A frequency-responsive alternating current bridge comprising an input for receiving an alternating current, a condenser and an inductive winding connected as a resonant circuit and adapted to effect a desired degree of balance of the bridge when resonated, means for adjusting the apparent inductance of said inductive winding to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying a tuning current to said tuning winding of the same frequency as that of any alternating current applied to said input, said auxiliary circuit having means for phasing said tuning current so that the tuning winding current in its alternations passes through zero at substantially the same time that the inductive winding current alternations pass through zero when an alternating current is applied to said input, and means for selectively reversing the phase of said tuning current.

6. A frequency responsive alternating current bridge comprising an input for receiving an alternating current, a condenser and an inductive winding connected as a resonant circuit and adapted to effect a desired degree of the balance of the bridge when resonated, means for adjusting the apparent inductance of said inductive winding to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying an adjustable tuning current to said tuning winding of the same frequency as that of any alternating current applied to said input, said auxiliary circuit having means for phasing said tuning current so that the tuning winding current in its alternations passes through zero at substantially the same time that the inductive winding current alternations pass through zero when an alternating current is applied to said input.

7. A frequency responsive alternating current bridge comprising an input for receiving an alternating current, a condenser and an inductive winding connected as a resonant circuit and adapted to effect a desired degree of balance of the bridge when resonated, and means for adjusting the apparent inductance of said inductive winding to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs.

8. A frequency responsive alternating current bridge comprising an input for receiving an alternating current, a condenser and an inductive winding connected as a resonant circuit and adapted to effect a desired degree of balance of the bridge when resonated, means for adjusting the apparent inductance of said inductive winding to tune said resonant circuit to resonate at a desired reference frequency, said means comprising means for superposing independently obtained mmfs. on the mmfs. produced by current of the resonant circuit flowing in said winding thereby creating a resulting mmf. to which the flux path of the winding is subjected, said winding being operable to have its apparent inductance changed in value in the same direction as the value of said resultant mmf. is changed by the independently obtained mmf., said means including a tuning winding inductively coupled to said inductive winding, and an auxiliary circuit for supplying a tuning current to said tuning winding of the same frequency as that of any alternating current applied to said input, said auxiliary circuit having phase shifting means for selectively phasing said tuning current so that the tuning winding current is substantially either in phase or in phase opposition with the inductive winding current when an alternating current is applied to said input.

9. An alternating current bridge for detecting frequency comprising an input circuit for receiving an alternating current whose frequency is to be detected, an output circuit for providing an output voltage indicative of the input frequency, a pair of opposing arms connected between said input and said output circuits, one arm being resistive in character, the other arm having a capacitor and an inductive winding connected to form a resonant circuit, the character of said arms being such that the bridge is balanced with zero output when the input is supplied with alternating current having a frequency equal to the resonant frequency of said resonant circuit, and means for adjusting the apparent inductance of said inductive winding to tune said resonant circuit, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying a tuning current to said tuning winding of the same frequency as that of any alternating current applied to said input, said auxiliary circuit having means for phasing said tuning current so that the tuning winding current in its alternations passes through zero at substantially the same time that the inductive winding current alternations pass through zero when an alternating current is applied to said input.

10. An alternating current bridge for detecting frequency comprising an input circuit for receiving an alternating current whose frequency is to be detected, an output circuit for providing an output voltage indicative of the input frequency, a pair of opposing arms connected between said input and said output circuits, one arm being resistive in character, the other arm having a capacitor and an inductive winding connected to form a resonant circuit, the character of said arms being such that the bridge is balanced with zero output when the input is supplied with alternating current having a frequency equal to the resonant frequency of said resonant circuit, and means for adjusting the apparent inductance of said inductive winding to tune said resonant circuit, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying an adjustable tuning current to said tuning winding of the same frequency as that of any alternating current applied to said input, said auxiliary circuit having means for phasing said tuning current so that the tuning winding current in its alternations passes through zero at substantially the same time that the inductive winding current alternations pass through zero when an alternating current is applied to said input.

11. An alternating current bridge for detecting frequency comprising an input circuit for receiving an alternating current whose frequency is to be detected, an output circuit for providing an output voltage indicative of the input frequency, a pair of opposing arms connected between said input and said output circuits, one arm being resistive in character, the other arm having a capacitor and an inductive winding connected to form a resonant circuit, the character of said arms being such that the bridge is balanced with zero output when the input is supplied with alternating current having a frequency equal to the resonant frequency of said resonant circuit, and means for adjusting the apparent inductance of said inductive winding to tune said resonant circuit, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs.

12. An alternating current bridge for detecting frequency comprising an input circuit for receiving an alternating current whose frequency is to be detected, an output circuit for providing an output voltage indicative of the input frequency, a pair of opposing arms connected between said input and said output circuits, one arm being resistive in character, the other arm having a capacitor and an inductive winding connected to form a resonant circuit, the character of said arms being such that the bridge is balanced with zero output when the input is supplied with alternating current having a frequency equal to the resonant frequency of said resonant circuit, and means for adjusting the apparent inductance of said inductive winding to tune said resonant circuit, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying a tuning current to said tuning winding of the same frequency as that of any alternating current applied to said input, said auxiliary circuit having phase shifting means for selectively phasing said tuning current so that the tuning winding current is substantially either in phase or in phase opposition with the inductive winding current when an alternating current is applied to said input.

13. A tunable resonant circuit comprising a capacitor, an inductive winding connected with the capacitor to form a resonant circuit, and means for changing the apparent inductance of the inductive winding thereby to tune the resonant circuit to resonate at a desired frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying a tuning current to said tuning winding of the same frequency as that of any alternating current applied across the resonant circuit, said auxiliary circuit having means for phasing said tuning current so that the tuning winding current in its alternations passes through zero at substantially the same time that the inductive winding current alternations pass through zero when an alternating current is applied across the resonant circuit, and means for selectively reversing the phase of said tuning current.

14. A tunable resonant circuit comprising a capacitor, an inductive winding connected with the capacitor to form a resonant circuit, and means for changing the apparent inductance of the inductive winding thereby to tune the resonant circuit to resonate at a desired frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying an adjustable tuning current to said tuning winding of the same frequency as that of any alternating current applied across the resonant circuit, said auxiliary circuit having means for phasing said tuning current so that the tuning winding current in its alternations passes through zero at substantially the same time that the inductive winding current alternations pass through zero when an alternating current is applied across the resonant circuit.

15. A tunable resonant circuit comprising a capacitor, an inductive winding connected with the capacitor to form a resonant circuit, and means for changing the apparent inductance of the inductive winding thereby to tune the resonant circuit to resonate at a desired frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs.

16. A tunable resonant circuit comprising a capacitor, an inductive winding connected with the capacitor to form a resonant circuit, and means for changing the apparent inductance of the inductive winding thereby to tune the resonant circuit to resonate at a desired frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying a tuning current to said tuning winding of the same frequency as that of any alternating current applied to the resonant circuit, said auxiliary circuit having phase shifting means for selectively phasing said tuning current so that the tuning winding current is substantially either in phase or in phase opposition with the inductive winding current when an alternating current is applied to the resonant circuit.

17. An alternating current frequency detector comprising an input for receiving an alternating current whose frequency is to be detected, a reference resonant circuit coupled to said input and including a capacitor and an inductive winding, an output circuit coupled to said reference circuit for providing output voltages indicative of the frequency of the alternating current applied to the input, and means for adjusting the apparent inductance of said inductive winding in order to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying to said tuning winding a tuning current having a substantial component either in phase or in phase opposition with the inductive winding current when an alternating current is applied to said input, and means for selectively reversing the phase of said tuning current.

18. An alternating current frequency detector comprising an input for receiving an alternating current whose frequency is to be detected, a reference resonant circuit coupled to said input and including a capacitor and an inductive winding, an output circuit coupled to said reference circuit for providing output voltages indicative of the frequency of the alternating current applied to the input, and means for adjusting the apparent inductance of said inductive winding in order to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, a magnetic core linking said windings, and an auxiliary circuit for supplying to said tuning winding an adjustable tuning current having a substantial component either in phase or in phase opposition with the inductive winding current when an alternating current is applied to said input, and means for selectively reversing the phase of said tuning current.

19. A tunable resonant circuit comprising a capacitor, an inductive winding connected with the capacitor to form a resonant circuit, and means for changing the apparent inductance of the inductive winding thereby to tune the resonant circuit to resonate at a desired frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit for supplying to said tuning winding a tuning current having a substantial component either in phase or in phase opposition with the inductive winding current when an alternating current is applied to the resonant circuit, and means for selectively reversing the phase of said tuning current.

20. A tunable resonant circuit comprising a capacitor, an inductive winding connected with the capacitor to form a resonant circuit, and means for changing the apparent inductance of the inductive winding thereby to tune the resonant circuit to resonate at a desired frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, a magnetic core linking said windings, and an auxiliary circuit for supplying to said tuning winding an adjustable tuning current having a substantial component either in phase or in phase opposition with the inductive winding current when an alternating current is applied to said resonant circuit, and means for selectively reversing the phase of said tuning current.

21. An alternating current frequency detector comprising an input for receiving an alternating current whose frequency is to be detected, a reference resonant circuit coupled to said input and including a capacitor and an inductive winding, an output circuit coupled to said reference circuit for providing output voltages indicative of the frequency of the alternating current applied to the input, and means for adjusting the apparent inductance of said inductive winding in order to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mms., said means including a tuning winding inductively coupled to said inductive winding, and an auxiliary circuit coupled to said input for supplying a tuning current of the same frequency as that of any alternating current applied to said input, said auxiliary circuit having phase shifting means for selectively phasing said tuning current so that the tuning winding current is substantially either in phase or in phase opposition with the inductive winding current when an alternating current is applied to said input.

22. A frequency responsive alternating current bridge comprising an input for receiving an alternating current, a condenser and an inductive winding connected as a resonant circuit and adapted to effect a desired degree of the balance of the bridge when resonated, means for adjusting the apparent inductance of said inductive winding to tune said resonant circuit to resonate at a desired reference frequency, said means comprising means for superposing independently obtained mmfs. on the mmfs. produced by current of the resonant circuit flowing in said winding thereby creating a resultant mmf. to which the flux path of the winding is subjected, said winding being operable to have its apparent inductance changed in value in the same direction as the value of said resultant mmf. is changed by the independently obtained mmfs., said means including a tuning winding inductively coupled to said inductive winding, and an auxiliary circuit coupled to said input for supplying to said tuning winding an adjustable tuning current having a substantial component either in phase or in phase opposition with the inductive winding current when an alternating current is applied to said input, and means for selectively reversing the phase of said tuning current.

References Cited in the file of this patent

UNITED STATES PATENTS

| Number | Name | Date |
|---|---|---|
| 1,708,544 | Kummerer | Apr. 9, 1929 |
| 2,137,877 | Kramer | Nov. 22, 1938 |
| 2,395,515 | Stoller | Feb. 26, 1946 |
| 2,532,368 | Malnqvist et al. | Dec. 5, 1950 |
| 2,537,767 | Langenwalter | Jan. 9, 1951 |

FOREIGN PATENTS

| Number | Country | Date |
|---|---|---|
| 560,172 | France | July 2, 1923 |